Figure 1:
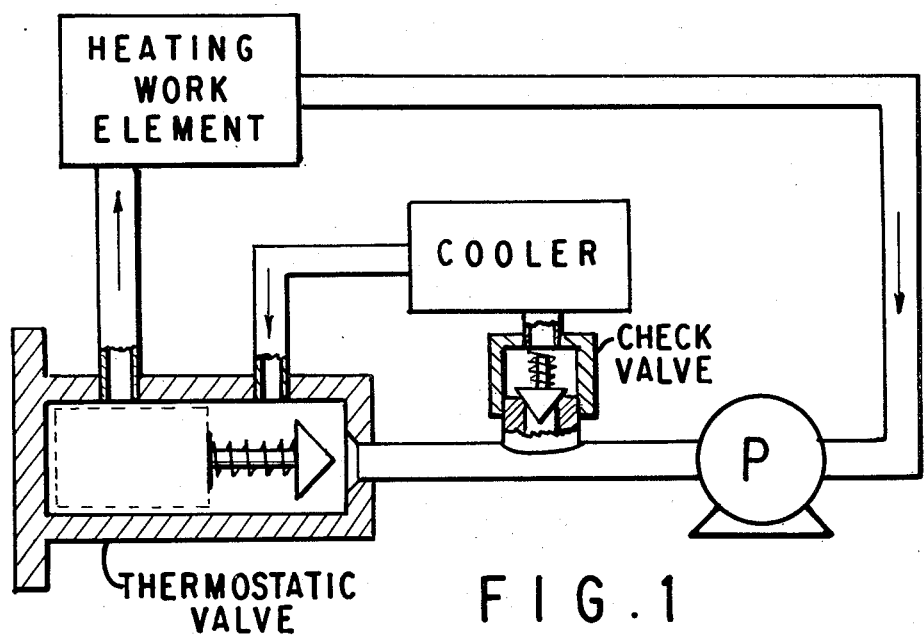

United States Patent [19]
Lavado

[11] 3,768,731
[45] Oct. 30, 1973

[54] FAIL SAFE THERMOSTATIC SWITCH
[75] Inventor: Neal M. Lavado, Waterbury, Conn.
[73] Assignee: Altair, Inc., Plymouth, Conn.
[22] Filed: Aug. 25, 1971
[21] Appl. No.: 174,877

[52] U.S. Cl.................. 236/93, 236/34.5, 236/101
[51] Int. Cl. ........................................ G05d 23/275
[58] Field of Search....................... 236/101, 93, 99, 236/34.5; 137/457, 468

[56] References Cited
UNITED STATES PATENTS
3,554,440   1/1971   Austin et al. ...................... 236/34.5
2,425,439   8/1947   Puster ............................... 236/34.5
3,273,796   9/1966   Bauerlein ......................... 236/93 X Primary Examiner—William E. Wayner
Attorney—Joseph B. Taphorn

[57] ABSTRACT

A thermostatic valve incorporates a second thermostatic element operative to close off the valve at a higher temperature if the primary thermostatic element fails.

5 Claims, 3 Drawing Figures

INVENTOR
NEAL M. LAVADO
BY
ATTORNEY 3,768,731

FAIL SAFE THERMOSTATIC SWITCH

This invention relates to thermostatic valves and more particularly to a thermostatic valve providing fail safe operation.

Thermostatic valves are employed in a fluid system to deflect the fluid through a cooler element when the fluid is above a certain temperature. It is a characteristic of these thermostatic valves that they fail most often in the unheated mode. Such failures lead to fluid overheating and destruction of the system.

Accordingly, it is an object of this invention to provide a thermostatic valve which will ensure against destruction of a fluid system because of overheating.

A more particular object of the invention is to provide a thermostatic valve which will fail safely, while another object of the invention is to provide a thermostatic valve which is simple and easy to manufacture.

These objects of the invention are achieved through a unique design of a thermostatic valve which advantageously incorporates a secondary thermostatic element. The secondary element is so mounted with respect to the primary thermostatic element, and both are so mounted with respect to the rest of the valve, that should the primary element fail, the secondary element, upon the fluid reaching a predeterminal higher temperature, will be effective to initiate desired valving action.

A feature of the invention is that the primary and secondary thermostatic elements are so incorporated in a design that both accommodate utilization of the same overpressure relief device.

Another feature of the invention is that a spring which facilitates biased operation of the overpressure relief device also functions as an overtravel spring to protect the primary thermostatic element from damage, which would occur if it expanded against a solid object in the event of excessive temperature.

Still another feature of the invention resides in the incorporation of the secondary thermostatic element in such a way that it can reset on a subsequent cool/heat cycle.

Figure 2:
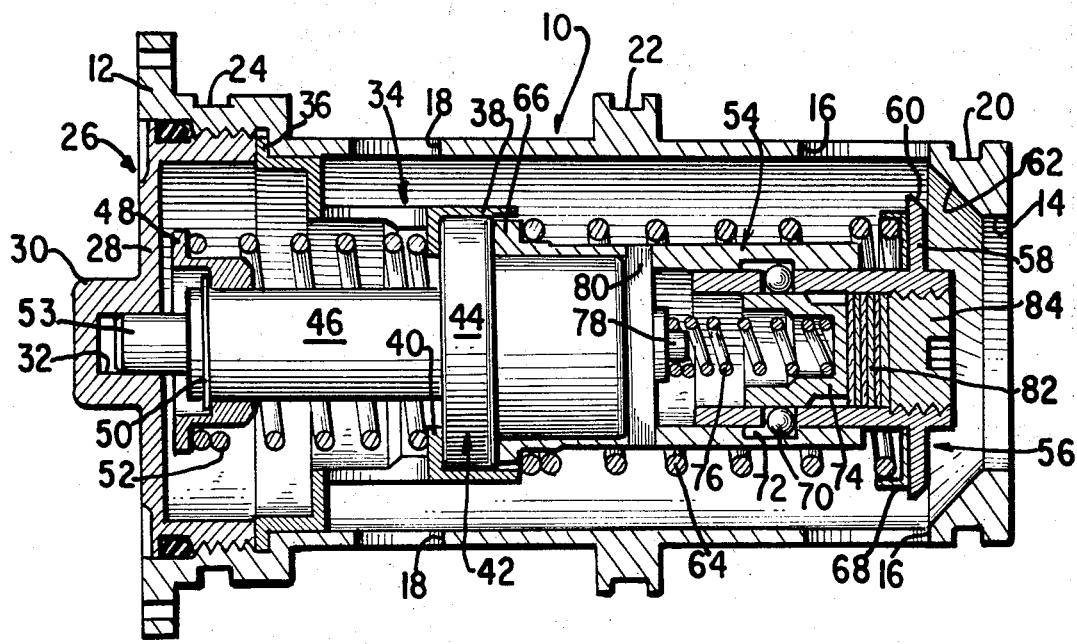
Figure 3:
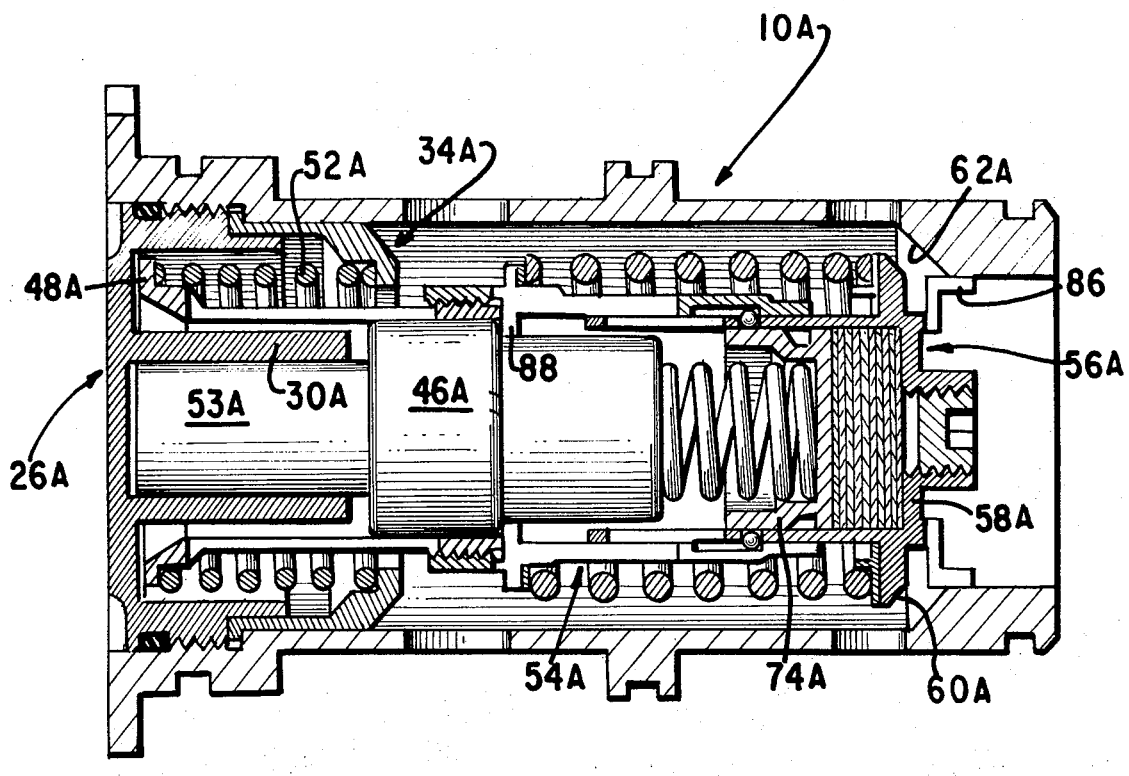

These and other objects, features, and advantages of the invention will become apparent from a reading of the following description of an embodiment of the invention when considered with the accompanying drawings, wherein:

FIG. 1 is a schematic diagram of a system utilizing a thermostatic valve according to the invention; and FIG. 2 is a longitudinal cross-sectional view of a thermostatic valve embodying the invention; and FIG. 3 is a longitudinal cross-sectional view of another thermostatic element embodying the invention.

Referring now to FIG. 1, in the schematic design of a system utilizing a thermostatic valve according to the invention, a pump is shown as providing fluid under pressure to operate a work element and which results in the fluid being heated. The fluid normally flows from the pump to the work element through the thermostatic valve. However, when the fluid heats up and reaches a predeterminal temperature, the thermostatic valve interrupts the normal flow of fluid to force the fluid past a check valve through a cooler element. When the fluid temperature reaches a preselected lower temperature, the thermostatic valve permits normal flow again.

An embodiment of the invention is set forth in FIG. 2. The thermostatic valve is shown as including a generally tubular housing 10. The tubular housing 10 is formed at its left hand end with a radically outwardly extending flange 12 provided with through holes whereby, when the tubular housing is inserted in a suitable opening of a thermostatic valve using system, the valve may be bolted in place. Such openings would have bores opening into it to establish fluid communications with the aforementioned pump, heating work element, and cooler. To define fluid paths with these bores from opening 14 in the right hand end of the housing 10 and openings 16 and 18 in the side walls thereof, grooves 20, 22, and 24 are formed in the housing 10 sidewalls to seat rubber O-rings effective to form fluid seals with the inner sidewalls of the receiving opening.

The left hand end of the tubular housing threadedly receives an end plate 26. It includes a wall 28 housing an outwardly extending central portion 30 defining an internal recess 32. The end plate 26 interacts with the tubular housing to secure a valving element mounting cage 34 in place by engaging therebetween a radically outwardly endings flange 36 thereof. The cage 34 at its right hand end is formed with an outwardly opening tubular portion 38 having a partial inner end wall defined by a radically directed flange 40. The remaining portion of the cage 34 is appropriately latticed to facilitate the flow of fluid therethrough.

A valving element 42 is slideably mounted within the tubular portion of the cage 34 by a collar 44. The valving element includes a thermostatic actuator cylinder 46 (of well known design) affixed to the left hand side of the collar 44. The left hand end of the cylinder 46 terminates short of the end plate 28 and mounts a spring seat 48 held in place by a clip 50. A compression spring 52 interacts between the seat 48 and the left hand side of the cage flange 40 to bias the valving element 42 to the left and to a normal position wherein its collar 44 rests against the right hand side of flange 40. A plunger 53 that moves out of the left hand end of the cylinder 46 upon a temperature rise beyond a predeterminal point, is received at its left hand end in the end plate recess 32.

The valving element 42 also includes a generally cylindrical element 54 affixed to the right side of the collar 44. The right hand end of the cylindrical element 54 is open ended and slideably mounts internally a valve poppet 56. The poppet 56 is formed with a radically extending flange 58 terminating in a conical surface 60. The surface 60 coacts with a conical surface 62 formed inside the right hand end of the tubular housing 10 about the opening 14, in the closed position of the valve to prevent fluid flow through the opening 14.

The valve poppet 56 is biased to its normal position with respect to the valving element 42 by a compression spring 64. The spring 64 reacts between a shoulder 66 formed on the inside end of the cylindrical element 54 and a centering washer 68 carried by the valve poppet 56 inside of the flange 58.

The normal position of the poppet under the bias of the spring 64 is determined by a plurality of balls 70 carried in radially aligned through holes formed in the side wall and midway of the valve poppet 56. The balls 70 normally extend into a groove 72 cut into the inside surface of the cylindrical element 54; the groove is of such axial length as to provide a safety factor accommodating overextension of the valving element 42.

The balls are caused to normally extend into the groove 72 by a generally cylindrically shaped retainer 74 in its normal right hand position. The retainer 74 is slidably mounted by its left hand end within the valve poppet and at its right hand end is reduced in diameter and closed off by an end wall. The retainer is urged to the right hand position by a compression spring 76 which reacts between a boss 78 projecting rightward from the middle of a cross plate 80 midway of the cylindrical element 54, and the end wall of the retainer 74. In the right hand position, the balls 70, which are of greater diameter than the thickness of the cylindrical wall of the valve poppet 56, are held by the left hand end of the retainer 74 so that they do not extend inside of the valve poppet but rather must extend into groove 72. The engagement of the balls 70 with the right hand end of the groove 72 determines the normal position to which the spring 64 biases the poppet 56 with respect to the valving element 42.

The normal, right hand position of the retainer 74 is determined by a set of bi-metal disc elements 82 held in place within the valve poppet 56 by the right hand end wall of the retainer 74 and by a set screw 84 threaded into the right hand end of the valve poppet 56. As the bi-metal discs 82 expand upon an abnormal rise in temperature, they will force the retainer 74 to the left and to where the reduced right hand end thereof is opposite the balls 70. The balls 70 may now move inward of the valve poppet under the camming action of the shoulder formed at the right hand edge of the groove 72 in the cylindrical element 54, upon the spherical surfaces of the balls. The valve poppet 56 can now move to the right under the bias of the spring 64 to close off the opening 14 upon an abnormal rise in temperature upon failure of the thermostatic actuating cylinder to accomplish valving action at a lower temperature.

In operation, during normal temperature, fluid enters the valve housing 10 through the opening 14. The fluid will travel through to the other end of the housing around the valving element 42 to the outlet openings 18. In the process, the cylindrical element 54 and the thermostatic actuator cylinder 46 will be appropriately bathed by the fluid, the latter as the fluid through turbulent action flows within the latticed cage 34, to reflect the temperature of fluid. When the fluid temperature rises to a predeterminal point, the thermostatic actuator cylinder 46 will normally be activated to move out the plunger 53 against the end plate 26. This will force the valving element 42 to the right to seat the face 60 of the poppet 56 in engagememt with the face 62 of the housing to close off the opening 14. Overdrive of the thermostatic actuator cylinder 46 and plunger 53 will be accommodated by the sliding action of the valve poppet 56 within the cylindrical element 54 by yielding of the spring 64 as the balls 70 move in the groove 72.

As observed earlier, fluid would now enter the valve housing through the inlet opening 16, having been deflected through a cooler element upon closing of openings 14. As the fluid cools down, the plunger 53 will retract within the thermostatic actuator cylinder 46 and the valving element will restore to the left under the action of the spring 52. The valve poppet 56 will be carried along to reopen the inlet opening 14 and normal operation will reobtain.

It may happen that the actuator cylinder 46 and plunger 53 are not properly activated on a particular temperature rise. In such cases, the bi-metal disc elements 82 will provide for fail safe operation to avoid over-heating. As the temperature continues to rise, the elements 82 will expand to push the retainer 74 to the left against the spring 76 to where the reduced right hand end of the retainer is opposite the balls 70. The balls may now be cammed inwards and the valve poppet 56 will move rightward to its opening 14 closing position under the influence of the spring 64.

As explained before, the cooled fluid will now begin entering the valve housing through the inlet 16. As the fluid temperature lowers and the bi-metal discs 82 retract to permit the spring 76 to move the retainer to the right and to cam through the shoulder between the retainer right and left portions the balls 70 radically outward, should the groove become aligned with the balls. This will happen on a subsequent heat cycle when the thermostatic actuator cylinder 46 and plunger 53 become effective again and compress spring 64 by movement of the cylindrical element 54 to the right while the poppet is held still by the face 62 about the housing inlet 14.

FIG. 3 shows another embodiment of the invention in which some of the corresponding parts with respect to FIG. 2 have been similarly numbered, differing therefrom by the postscript "A." The FIG. 3 design provides for more accurate and reliable seating of the valve poppet 56A by incorporating a barrel guide 86 to cooperate with an elongated opening 14A in the right hand end of the housing 10A. It also provides for simplified construction by incorporating a guide 30A instead of a boss in the end plate 26. This permits a simpler thermostatic actuator cylinder 46A to be employed wherein the larger plunger 53A is received within the guide 30A. The spring seat 48A is elongated and threadedly secured at its right hand end to the cylindrical element 54A. An internally directed shoulder 88 on the element 54A interacts with the enlarged cylindrical portion of the thermostatic actuator to urge it to the left under the action of the spring 52A upon the seat 48A. Upon a rise in temperature, the thermostatic actuator acts on the shoulder 88 to push the poppet valve 56A into seating engagement while guided by the barrel guide 86 in the elongated housing opening 14A. In other respects, the embodiment of FIG. 3 operates like that of FIG. 2.

While there has been shown and described a preferred embodiment of the invention, it will be understood that it was exemplary only and that the scope of the invention is intended to be limited only by the appended claims.

What is claimed is:

1. In a valve construction responsive to temperature change to affect fluid flow from a common path through diverse paths through valving action, a valve housing having a primary and a secondary inlet opening and an outlet opening, a valve element having a first portion and a normally latched thereto second portion movable from a position to a second position closing off said primary opening, a spring biasing the valve element first portion to place the latched second portion in said a position, a first thermostatic element carried by said valve element first portion and effective at one temperature to react against said housing and move said latched valve element second portion to a second position, a second spring biasing said valve element second portion to said second position, and a second thermostatic element carried by said valve element second portion and effective at a higher temperature to react against a portion of said valve element when in the first position to unlatch said second portion and permit said second spring to move the second portion of the valve element to the second position, said first thermostatic element being effective to return the valve element to the first position when fluid temperature passes below a certain temperature, said valve element second portion being relatchable to its first position upon a temperature decrease, both said thermostatic elements being in said common path.

2. In a valve construction responsive to temperature change to affect fluid flow from a common path through diverse paths through valving action, a valve housing having inlet and outlet openings, a valve element having a first portion and a normally latched thereto second portion movable from a first position to a second position, a spring biasing the valve element first portion to place the latched second portion in said first position, a poppet on said valve element second portion closing off one of said openings in the second position, a first thermostatic element carried by said valve element first portion and effective at one temperature to react against said housing and move said latched valve element second portion to second position, a second spring biasing said valve element second portion to said second position, a second thermostatic element carried by said element second portion and effective at a higher temperature to react against a portion of said valve element to unlatch said second portion and permit said second spring to move said poppet to the second position, said valve element second portion not being relatchable to its first portion upon a temperature decrease if there has been a failure of the first thermostatic element, both said thermostatic elements being in said common path.

3. In valve construction responsive to temperature change to affect fluid flow from a common path through diverse paths through valving action, a valve housing having primary and secondary inlet and outlet openings, a valve element movable from a first position to a second position, a normally fixedly mounted poppet on said valve element and closing off the primary opening when the element is in the second position, a first thermostatic element carried by said valve element and normally effective at one temperature to react against said housing and move said element to the second position, a spring biasing the poppet with respect to the element and to the outlet opening closing position, locking means normally fixing the poppet on said position, locking means normally fixing the poppet on said element, a second thermostatic element on said valve element, and means controlled by the second thermostatic element for operating said locking means to permit the poppet to move with respect to the element when a higher temperature is reached and the thermostatic element was inactive, said locking means being effective to refix the poppet on said element upon a temperature decrease or an unlocking due to unusual shock or excessive vibration both said thermostatic elements being in said common path.

4. In a valve construction responsive to temperature change to affect fluid flow from a common path through diverse paths through valving action, a valve housing having primary and secondary inlet and outlet openings, a valve element movable from a first to a second position, a relatively fixedly mounted poppet having a normal position on said valve element and normally closing off said primary inlet opening when the valve element is in the second position, a spring biasing the valve element to the first position, a thermostatic element on said element and having a plunger normally pushing against said housing when a first temperature is reached to move said element against said spring to the second position, a spring on said element biasing the poppet to its normal position but yieldable to accommodate overdrive of the thermostatic element and overpressure from the closed primary inlet opening, locking means normally fixing the poppet with respect to the valve element to accommodate only a limited amount of relative movement, a thermostatic element mounted in said poppet, and means controlled by said poppet thermostat element for operating said locking means to permit the poppet to move with respect to the valve element when a higher temperature is reached and the first thermostatic element was inactive said locking means being effective to refix the poppet on said valve element upon reactivation of the first thermostatic element, both said thermostatic elements being in said common path.

5. In a valve construction according to claim 4 where the locking means is a groove in the valving element and balls in said poppet, and the means controlled by said poppet element includes a camming surface.

\* \* \* \* \*